United States Patent [19]

Persson

[11] Patent Number: 4,981,250

[45] Date of Patent: Jan. 1, 1991

[54] EXPLOSION-WELDED PIPE JOINT

[75] Inventor: Per I. Persson, Nora, Sweden

[73] Assignee: Exploweld AB, Nora, Sweden

[21] Appl. No.: 402,751

[22] Filed: Sep. 5, 1989

[30] Foreign Application Priority Data

Sep. 6, 1988 [SE] Sweden ............................ 8803131

[51] Int. Cl.$^5$ ............................................ B23K 20/08
[52] U.S. Cl. .................................. 228/107; 228/108; 228/109
[58] Field of Search .............. 228/107, 108, 109, 2.5; 29/421.2

[56] References Cited

U.S. PATENT DOCUMENTS

| | | | |
|---|---|---|---|
| 3,455,017 | 7/1969 | Zondag | 228/108 |
| 3,985,279 | 10/1976 | Wilson | 228/109 |
| 4,231,506 | 11/1980 | Istvanffy et al. | 228/109 |
| 4,809,902 | 3/1989 | Persson | 228/107 |
| 4,815,649 | 3/1989 | Delersjö | 228/109 |

FOREIGN PATENT DOCUMENTS

86/02300  9/1986  World Int. Prop. O. .......... 228/109

Primary Examiner—Sam Heinrich
Attorney, Agent, or Firm—Nies, Kurz, Bergert & Tamburro

[57] ABSTRACT

The invention relates to a method of producing explosion-welded joints between the pipe or pipe lines. By carefully evaluating and testing the configuration of the ends of the pipes to be joined and also the functioning of the charge system, together with a system for encapsulating the charge and for determining the position of the charge during a welding sequence, it has been possible to provide a practical and reproduceable system which escapes the drawbacks of partial and poor weld bonds, cold-work hardening of the pipe material, and surface damage encountered with known systems of this kind. The method has been applied and tested on ferritic stainless material, so-called Duplex material, and on all carbon steel grades used in the production of pipe lines.

8 Claims, 1 Drawing Sheet

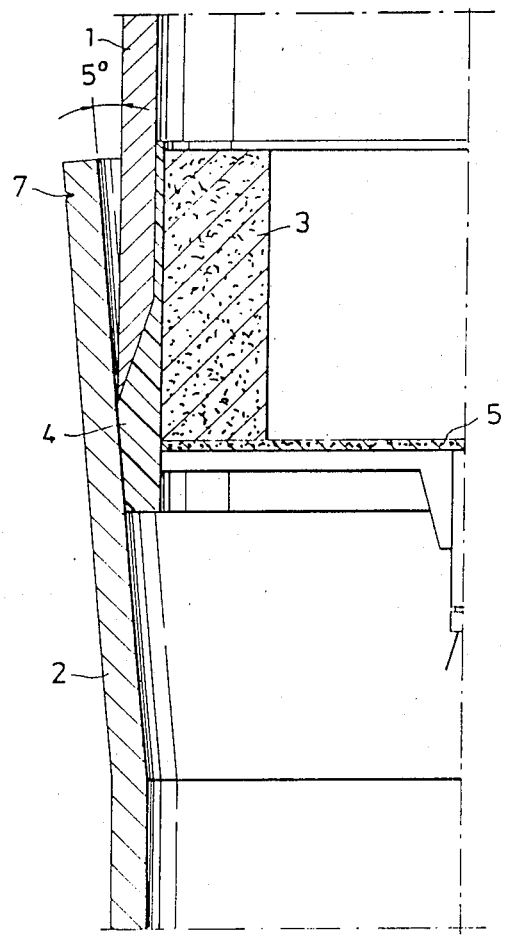

EXPLOSION-WELDED PIPE JOINT

The explosion-welding of pipe joints in pipeline systems is of great interest, because welding operations can be carried out quickly and reliably, and without being dependent on external energy sources, such as electricity or gas.

Many different pipe joints have been developed and made the subject of patent applications over the passage of years.

Several of these known pipe joints, however, have been found to produce undesirable defects, such as non-bonded regions at the ends of the pipes, cold-work hardening or surface damage, all of which represent locations for potential attack by corrosion.

The pipe joint proposed in accordance with the present invention provides a complete bond and produces very little cold-working hardening and results in no surface damage.

Furthermore, as distinct from other known types of pipe joint which have two welds, the inventive pipe joint has only one weld, and no additional material need be added.

DESCRIPTION

The joint construction is illustrated in the accompanying drawing. The reference numeral 1 and 2 in the drawing identify the ends of two pipes to be welded together. The end 1 of one pipe has been chamfered internally, down to an angle of 12° to 17° preferably 15°, whereas the end 2 of the other pipe, e.g., the end of a pipeline, has been pressed out to a conical configuration, to form a cone angle of 5° to 20°, preferably 10°, a cone angle of 5° being shown in the drawing.

The explosive welding charge, 3, is a moulded charge which consists of an explosive, such as PETN, HMK or RDX, bound in a silicone rubber matrix. An addition of iron powder and glass spheres or beads is also included, additional to the explosive. The composition of the charge is adapted to obtain a detonation velocity of from 3700 m/s to 4300 m/s, preferably 3900 m/s.

The reference 4 identifies a plastic capsule which has the shape illustrated and which ensures that the explosive charge is positioned correctly in relation to the pipe ends and also that the charge has precise dimensions.

The charge is detonated by a charge detonating disc 5 which comprises an explosive substance of high brisance (a high crushing effect), e.g. PETN, RDX or HMX, bonded with silicone oil, plastic or latex, although such that the explosive substance equals at least 70% of the weight of the charge. This is necessary in order to produce detonation pressure which will suffice to fully detonate the explosive welding charge and to cause detonation in thin strata, or layers, so as to be able to minimize the total amount of charge.

The plastic capsule 4, and therewith the welding charge 3 has an axial extension, such as to enable detonation to reach a stable state before the detonation front reaches the point of the chamfered pipe end 1.

In this respect, the distance from the detonation disc to the chamfer point of the pipe end is at least 5 mm, preferably at least 6 mm. If one initiates firing of the detonating disc at its center, a full, axially directed detonation of the explosive welding charge can be realized.

This will result in the establishment of a complete bond at the point of said chamfered pipe end and therewith avoid the possibility of cavity corrosion.

The reference numeral 7 shown in the drawing identifies a fracture indication in the form of an annular external groove ground in the pipe material at least 10 mm from the extremity of pipe end 2. When the shock wave reflected from the pipe end 2 reaches the location of the groove, the pipe material will shear-off peripherally therearound. The sheared part of the pipe will therefore function as a wave trap and a complete bond will be obtained on the remaining part of the pipe. Those experiments carried out in order to establish suitable angles between the inner surface of the cone part of pipe end 2 and the rectilinear outer surface of pipe end 1, showed that an angle of 5° will provide very good and reproduceable welds on ferritic stainless pipes of Duplex type.

In the case of more-readily welded materials, coned angles of pipe end 2 down to 3° can be used without jeopardizing reproduceability of a satisfactory welded joint. A chamfer angle of 15° has been found to produce good binding results at the pointed end of the pipe end 1. Although chamfer angles of pipe end 1 smaller than 15° are fully acceptable, they require unnecessarily long charge lengths, without affording appreciable improvement of the result.

Angles larger than 15° give inferior reproduceability of the bond at the point of the chamfered extremity of pipe end 1.

I claim:

1. A method of welding two pipes into a jointed assembly by explosion welding, characterized by giving one end of a first one of said two pipes an outward conical configuration with a cone angle of 5° to 20°, chamfering the inner surface of the adjacent end of the second one of said two pipes down to an angle of 12°–17°; placing said chamfered end of said second pipe concentrically into the conical end of said first pipe; introducing into said concentric two pipe ends an explosive welding charge comprising an explosive substance, iron powder and hollow glass spheres embodied in a silicone-rubber matrix and having a composition such as to obtain a detonation velocity of from 3700 m/s to 4300 m/s; detonating said explosive welding charge with the aid of a thin detonating disc with a detonation velocity of at least about 6500 m/s; said charge being contained in a plastic capsule adapted to the configuration of the concentrically arranged pipe ends in a manner such that the position of the contained charge in the axial and radial directions is constantly determined and reproduceable; and by placing the detonating disc at a distance of at least 5 mm from the extremity of the chamfered pipe end, so that detonation in the explosive charge will have reached a constant velocity prior to commencement of the welding process.

2. A method according to claim 1, characterized by forming a fracture indication in said first pipe in the form of a annular groove at least 10 mm from the extremity of the conical pipe end.

3. A method according to claim 1, characterized in that the charge is based on the explosive substances PETN, HMX or RDX, which in admixture with iron powder, and hollow glass spheres, are given said detonation velocity.

4. A method according to claim 1, characterized by initiating firing of the detonating disc in the center thereof, so as to obtain full axially directed detonation of the explosive welding charge.

5. A method as defined in claim 1, wherein said one end of said first pipe has a conical configuration with a cone angle of 10°.

6. A method as defined in claim 1, wherein said on end of said first pipe has a conical configuration with a cone angle of 5°.

7. A method as defined in claim 1, wherein said one end of said second pipe has an internal surface extremity chamfer of 15°.

8. The method as defined in claim 1, wherein the welding charge has a composition enabling obtaining a detonation velocity of 3900 m/s.

* * * * *